(12) United States Patent
Ito et al.

(10) Patent No.: US 7,874,624 B2
(45) Date of Patent: Jan. 25, 2011

(54) CUSHION BODY, SEAT, AND METHOD OF MANUFACTURING THE SAME

(75) Inventors: Mika Ito, Tochigi (JP); Shinji Sugiyama, Tochigi (JP)

(73) Assignee: TS Tech Co., Ltd. (JP)

( * ) Notice: Subject to any disclaimer, the term of this patent is extended or adjusted under 35 U.S.C. 154(b) by 0 days.

(21) Appl. No.: 12/295,406

(22) PCT Filed: Mar. 29, 2007

(86) PCT No.: PCT/JP2007/056828

§ 371 (c)(1),
(2), (4) Date: Sep. 30, 2008

(87) PCT Pub. No.: WO2007/114231

PCT Pub. Date: Oct. 11, 2007

(65) Prior Publication Data
US 2009/0108494 A1    Apr. 30, 2009

(30) Foreign Application Priority Data
Mar. 31, 2006    (JP) .............................. 2006-099442

(51) Int. Cl.
A47C 7/18    (2006.01)
(52) U.S. Cl. ..................... 297/452.48; 5/952
(58) Field of Classification Search .......... 297/452.48; 5/952, 653, 690
See application file for complete search history.

(56) References Cited

U.S. PATENT DOCUMENTS

| 3,148,389 | A | * | 9/1964 | Lustig | .......................... 5/645 |
| 3,616,171 | A | * | 10/1971 | Hoskinson, Sr. | .... 297/452.48 X |
| 3,670,348 | A | * | 6/1972 | Irwin | .......................... 5/952 X |
| 3,740,774 | A | * | 6/1973 | Powell | ............... 297/452.48 X |
| 3,742,526 | A | * | 7/1973 | Lillard | ............... 297/452.48 X |
| 3,772,137 | A | * | 11/1973 | Tolliver | .................... 5/592 X |
| 5,134,740 | A | * | 8/1992 | Summer | ............ 297/452.48 X |
| 5,189,743 | A | * | 3/1993 | Difloe | ....................... 5/952 X |
| 5,669,799 | A | * | 9/1997 | Moseneder et al. | . 297/452.48 X |
| 6,425,637 | B1 | * | 7/2002 | Peterson | ............ 297/452.48 X |
| 2004/0222685 | A1 | * | 11/2004 | Steagall et al. | ........ 297/452.48 |
| 2008/0018162 | A1 | * | 1/2008 | Galbreath et al. | ..... 297/452.48 |
| 2008/0284231 | A1 | * | 11/2008 | Takei et al. | ........... 297/452.48 |
| 2009/0267401 | A1 | * | 10/2009 | Ito et al. | ............... 297/452.58 |
| 2009/0273222 | A1 | * | 11/2009 | Takei et al. | ........... 297/452.48 |
| 2010/0019560 | A1 | * | 1/2010 | Ito | ....................... 297/452.48 |

FOREIGN PATENT DOCUMENTS

| JP | 7 303546 | 11/1995 |
| JP | 8 318066 | 12/1996 |
| JP | 2000 107470 | 4/2000 |

* cited by examiner

Primary Examiner—Rodney B White
(74) Attorney, Agent, or Firm—Schiff Hardin LLP

(57) ABSTRACT

A cushion body 11 is formed by stacking a first sheet-like fibrous structure 4a and a second sheet-like fibrous structure 4b where webs 2 are stacked such that their extending direction conforms with a thickness direction T of the cushion body and between the first sheet-like fibrous structure 4a and the second sheet-like fibrous structure 4b, a load receiving member 4e whose flexing degree to load in the thickness direction T is small is disposed.

6 Claims, 11 Drawing Sheets

CUSHION BODY, SEAT, AND METHOD OF MANUFACTURING THE SAME

TECHNICAL FIELD

The present invention relates to a cushion body, a seat, and a method of manufacturing the same, and in particular to a cushion body and a seat using a fibrous structure composed of polyester fibers or the like, and a method of manufacturing the same.

BACKGROUND ART

Conventionally, a seat using a fibrous structure composed of polyester fibers or the like as a cushion body has been known (for example, see Patent Document 1 cited below). The fibrous structure used in the seat described in Patent Document 1 is formed by successively folding a web obtained by dispersing and incorporating thermally adhesive composite short fibers as an adhesive component into matrix fibers composed of an inelastic polyester crimped short fiber assembly in a standing state along its longitudinal direction. That is, this fibrous structure is formed to have a predetermined thickness by folding the web in an accordion shape.

In the seat described in Patent Document 1, each of a seat portion and a seat back portion is constituted by stacking a plurality of this fibrous structures to form a cushion body and coating this cushion body with a cover. Accordingly, in this seat, since the standing direction of the web (a thickness direction of the cushion body) is directed along a load direction during sitting of a seat occupant, excellent ventilation is, of course, secured, a proper hardness to a load direction is provided, and load can be dispersed. Therefore, this seat can provide a soft touch feeling which cannot be obtained by urethane conventionally used in general.

Patent Document 1: Japanese Patent Laid Open Publication No. 1996(H08)-318066.

DISCLOSURE OF THE INVENTION

Problem to be Solved by the Invention

Since the seat described in Patent Document 1 has a structure such that a longitudinal direction of fibers extends along a load direction, it can support a sufficient load while maintaining a soft touch feeling. However, in the seat described in Patent Document 1, since each of the seat portion and the seat back portion is formed by only stacking a plurality of accordion-shaped fibrous structures, a soft touch feeling can be obtained but there is a problem that durability is poor as a seat. On the other hand, when the number of stacks of fibrous structures is increased in order to improve the durability, hardness can be obtained to some extent, but such a drawback arises that the unique soft touch feeling of the fibrous structures is lost from the fibrous structures.

An object of the present invention is to provide a cushion body and a seat which can secure both a soft touch feeling and durability by stacking a plurality of fibrous structures with a predetermined thickness folded in a standing state, and a method of manufacturing the same.

Means for Solving the Problem

A cushion body according to an embodiment of the present invention is a cushion body obtained by molding a fibrous structure obtained by mixing main fibers and binder fibers using a mold having a cavity with a predetermined shape, wherein the cushion body is formed by stacking a plurality of the fibrous structures, and a load receiving member whose flexing degree to load in a thickness direction is smaller than that of the fibrous structure is disposed between the plurality of fibrous structures stacked.

Thus, since the cushion body of the present invention is formed by the fibrous structure in which the main fibers and the binder fibers are mixed, the cushion body flexes largely in a load direction when it is applied with external load due to sitting or the like. Therefore, a soft touch feeling can be provided to a seat occupant during seating. Since the load receiving member whose flexing degree to load in the thickness direction is smaller than the fibrous structure is disposed between the plurality of fibrous structures, when the fibrous structure receives load in the thickness direction, the load receiving member can receive and disperse the load from the fibrous structure. Accordingly, fatigue in the load direction hardly occurs in the cushion body so that durability of the cushion body can be secured. Thus, according to the cushion body of the present invention, both a soft touch feeling and durability can be realized.

It is preferable that the load receiving member is formed from a fiber material or a resin material.

Alternatively, the load receiving member is preferably formed from approximately the same fiber material as the fibrous structure and is formed to have a fiber density higher than that of the fibrous structure.

Thus, the fibrous structure and the load receiving member are formed from approximately the same fiber material and they are made different in fiber density, so that both the structures can be constituted to have different flexing degrees. Since the fibrous structure and the load receiving member are formed from approximately the same fiber material, it is unnecessary to separate the fibrous structures into respective different fiber materials at disposal of the cushion body so that work for separation is omitted, which results in improvement of recycling easiness.

The seat in one embodiment of the present invention is a seat including a cushion body and a seat frame supporting the cushion body, wherein the cushion body is any one of the cushion bodies described above.

Thus, since the seat of the present invention uses the cushion body provided with a soft touch feeling and durability such as described above, it is provided with a soft touch feeling during sitting on the seat and high durability to load due to sitting on the seat.

The method of manufacturing a cushion body according to an embodiment of the present invention is a method of manufacturing a cushion body comprising a fibrous structure, comprising at least: a fibrous structure forming step of successively folding a web composed of main fibers and binder fibers for each predetermined length to form a fibrous structure as a stacked state; a fibrous structure disposing step of stacking a plurality of the fibrous structures and disposing the fibrous structure and the load receiving member in a mold having a cavity with a predetermined shape in a stacked and compressed state, where the load receiving member whose flexing degree to load in the thickness direction is smaller than that of the fibrous structure is disposed between the plurality of fibrous structures stacked; and a molding step of thermally molding the fibrous structure and the load receiving member in the mold to form a cushion body.

Thus, in the method of manufacturing a cushion body according to an embodiment of the present invention, since the plurality of fibrous structures and the load receiving member are disposed in a state that they are stacked and compressed in the mold and are thermally molded, integral molding can be performed in the mold. Therefore, a bonding step can be skipped unlike a case that the fibrous structure and load receiving member as well as the fibrous structures are bonded to each other using adhesive, so that tact time spent for cushion body manufacture can be reduced.

Also, in the molding step, it is preferable that steam is blown under barometrical pressure to the fibrous structure through steam holes formed through a mold face of the mold where the barometrical pressure is higher than atmospheric pressure.

Thus, in the method of manufacturing a cushion body, the fibrous structures are disposed in the mold formed with steam holes in a compressed state thereof, and steam is blown to the fibrous structure under barometrical pressure higher than atmospheric pressure. Thereby, steam blown to the mold can pass through the inside of the fibrous structures through the steam holes formed in the mold without causing adiabatic expansion while it is being kept at a molding temperature. At this time, since steam has a heat capacity larger than hot air, the fibrous structure can be molded in a short time so that molding time can be reduced largely in the present invention. Since the molding time is reduced, heating process time of the fibrous structure is reduced, so that texture of the cushion body after molded can be made good.

Furthermore, in this case, it is preferable that the steam holes are formed to be more numerous in a region corresponding to the side of a non-load receiving face which does not receive load from outside the cushion body than in a region corresponding to the load receiving face which receives the load from outside the cushion body in the mold, and steam is blown to the fibrous structure through the steam holes on the side of the non-load receiving face in the molding step.

Thus, in the method of manufacturing a cushion body according to an embodiment of the present invention, since the number of steam holes on the side of the non-load receiving face on the mold is larger than that on the side of the load receiving face, an amount of steam introduced from the side of the non-load receiving face into the mold becomes more than that introduced from the load receiving face. When the amount of steam introduced is increased, the number of fibers melded and fixed by thermal molding increases so that a structure of the fibrous structure is made firm and hardness thereof is increased. Therefore, hardness of a surface layer of the fibrous structure disposed on the side of the non-load receiving face becomes harder than that of a surface layer of the fibrous structure disposed on the load receiving face. That is, it is possible to increase a flexing degree to a load by lowering the hardness on the load receiving face side receiving load from the outside due to sitting and the like and decrease a flexing degree to a load on the non-load receiving face side. Accordingly, it is made possible to provide a cushion body having both soft touch feeling during sitting on a seat and durability to load due to sitting on the seat.

Also, it is preferable in the fibrous structure disposing step if the number of the fibrous structures disposed between the load receiving face which receives the load from outside the cushion body and the load receiving member is adjusted in stacking according to touch feeling required for the cushion body after thermal molding. According to the method of manufacturing a cushion body, the touch feeling from the load receiving member received by the seat occupant when sitting can be made different according to the number of, that is, the thickness of the fibrous structures between the load receiving face and the load receiving member. Accordingly, a cushion body provided with a desired touch feeling can be manufactured.

A method of manufacturing a seat according to an embodiment of the present invention is a method of manufacturing a seat comprising a cushion body and a seat frame supporting the cushion body, comprising at least: a step of forming the cushion body according to the method of manufacturing the cushion body described above; and a step of attaching the cushion body to the seat frame.

Thus, since a cushion body having both a soft touch feeling and durability is used as mentioned above, the method of manufacturing a seat according to the present invention can provide a seat having both a soft touch feeling during sitting on the seat and durability to load applied during sitting on the seat.

Effect of the Invention

According to an embodiment of the present invention, since the cushion body is formed by the fibrous structure in which the main fibers and the binder fibers are mixed, the cushion body flexes largely in a load direction when it is applied with external load, and a soft touch feeling can be provided. Also, since the load receiving member has a flexing degree to load in the thickness direction smaller than that of the fibrous structure and maintains hardness to some extent, durability can be improved by dispersing the load received by the fibrous structure. Thus, according to the cushion body of the present invention, both a soft touch feeling and durability can be realized.

EXPLANATION OF REFERENCE NUMERALS

Figure 1:
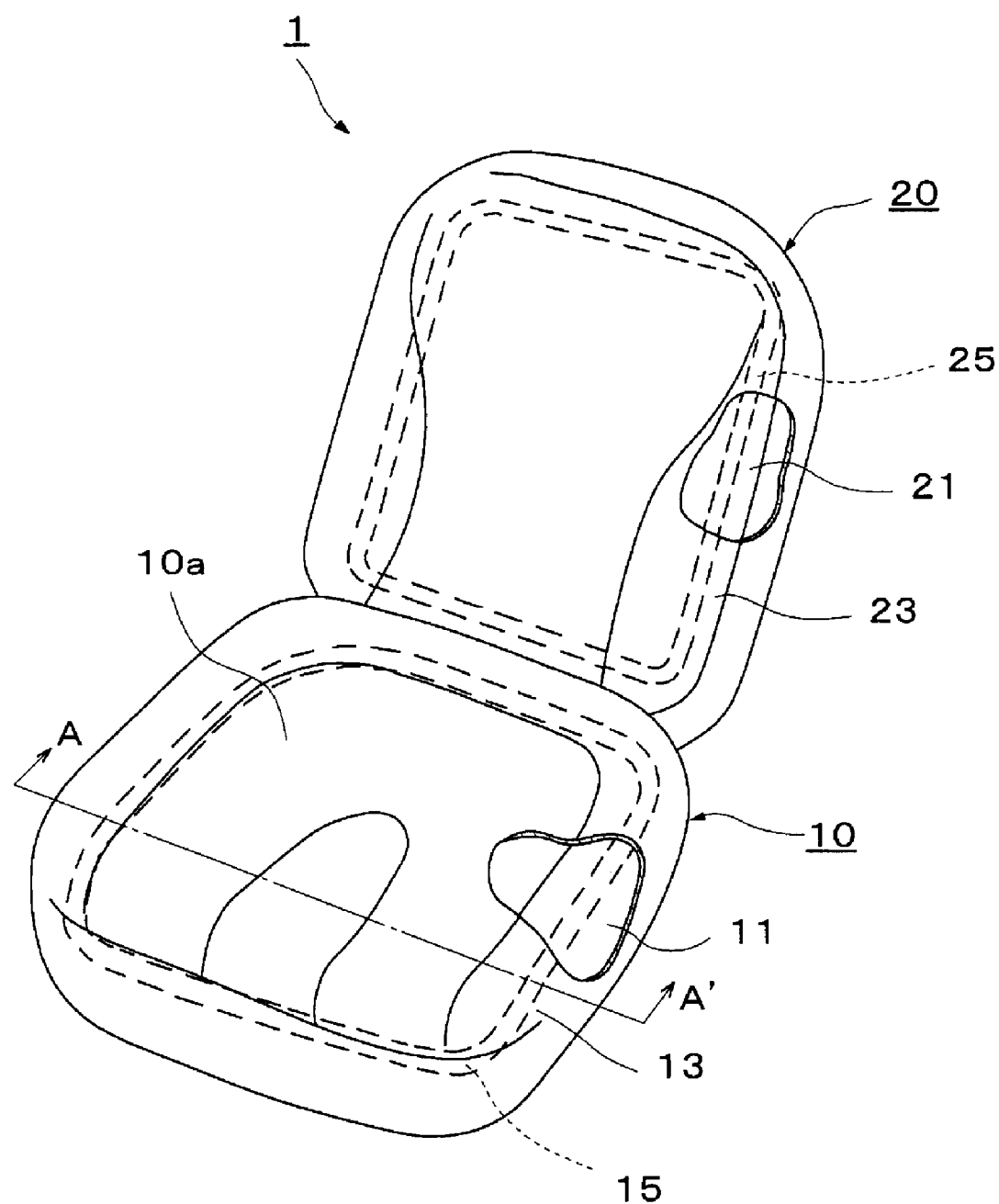
FIG. 1 is an explanatory view of a seat.

1: seat
2: web
4*a*: first sheet-like fibrous structure (fibrous structure)
4*a*-1: upper sheet-like fibrous structure (fibrous structure)
4*a*-2: lower sheet-like fibrous structure (fibrous structure)
4*b*: second sheet-like fibrous structure (fibrous structure)
4*b*-1: upper sheet-like fibrous structure (fibrous structure)
4*b*-2: lower sheet-like fibrous structure (fibrous structure)
4*c*: U-shaped sheet-like fibrous structure
4*d*: protrusion type sheet-like fibrous structure
4*e*: load receiving member
10: seat portion 10a: sitting surface (load receiving face)
10b: back surface (non-load receiving face)
11, 21: cushion body
13, 23: cover
15, 25: seat frame
17: trim cord
19: engagement portion
20: seat back portion
40: mold
40a: cavity
41: first mold
42: second mold
43: steam hole
50: high pressure steam molding machine
61: driving roller
62: hot air suction type heat treating machine
a: fiber constituting web
b: lengthwise direction of web
c: fiber direction constituting web
θ: angle of lengthwise direction of fiber to lengthwise direction of web

BEST MODE FOR CARRYING OUT THE INVENTION

One embodiment of the present invention will be explained below with reference to the drawings. Incidentally, parts, arrangements or the like explained below do not limit the present invention, and the present invention can be modified variously within the scope and spirit of the present invention.

Figure 2:
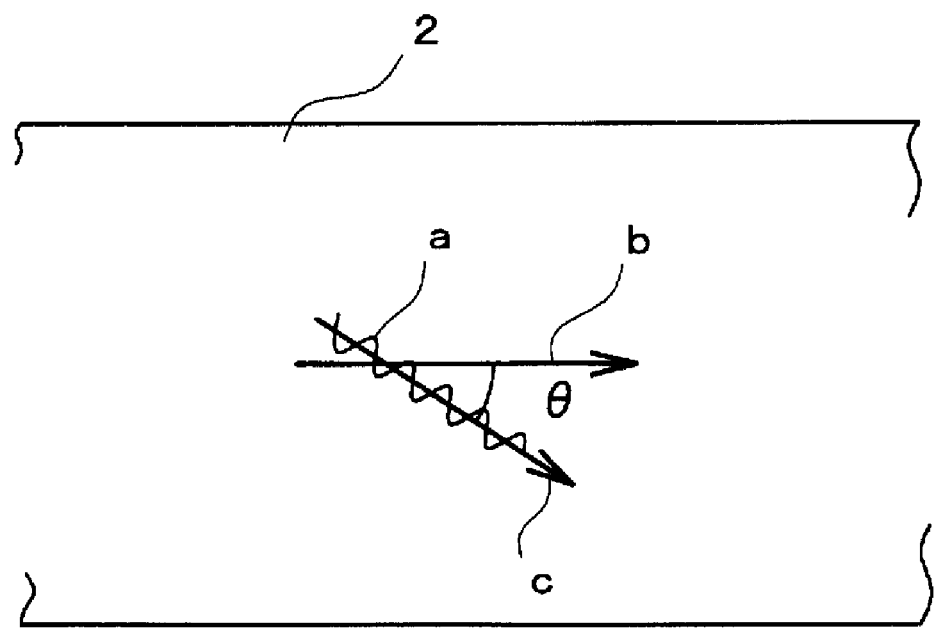
FIG. 2 is an explanatory diagram of a fiber direction of a web.
Figure 3:
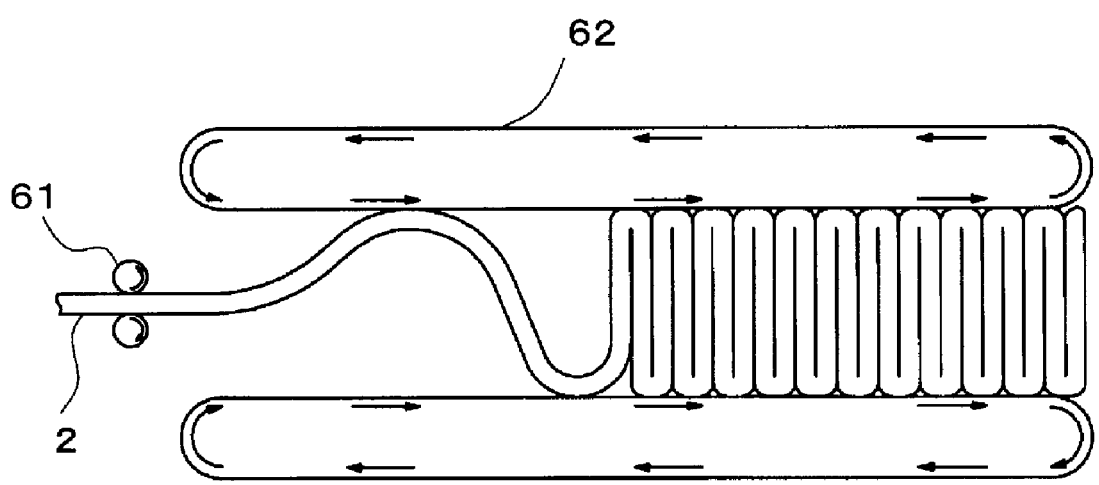
FIG. 3 is an explanatory diagram of a manufacturing step of a sheet-like fibrous structure.
Figure 4:
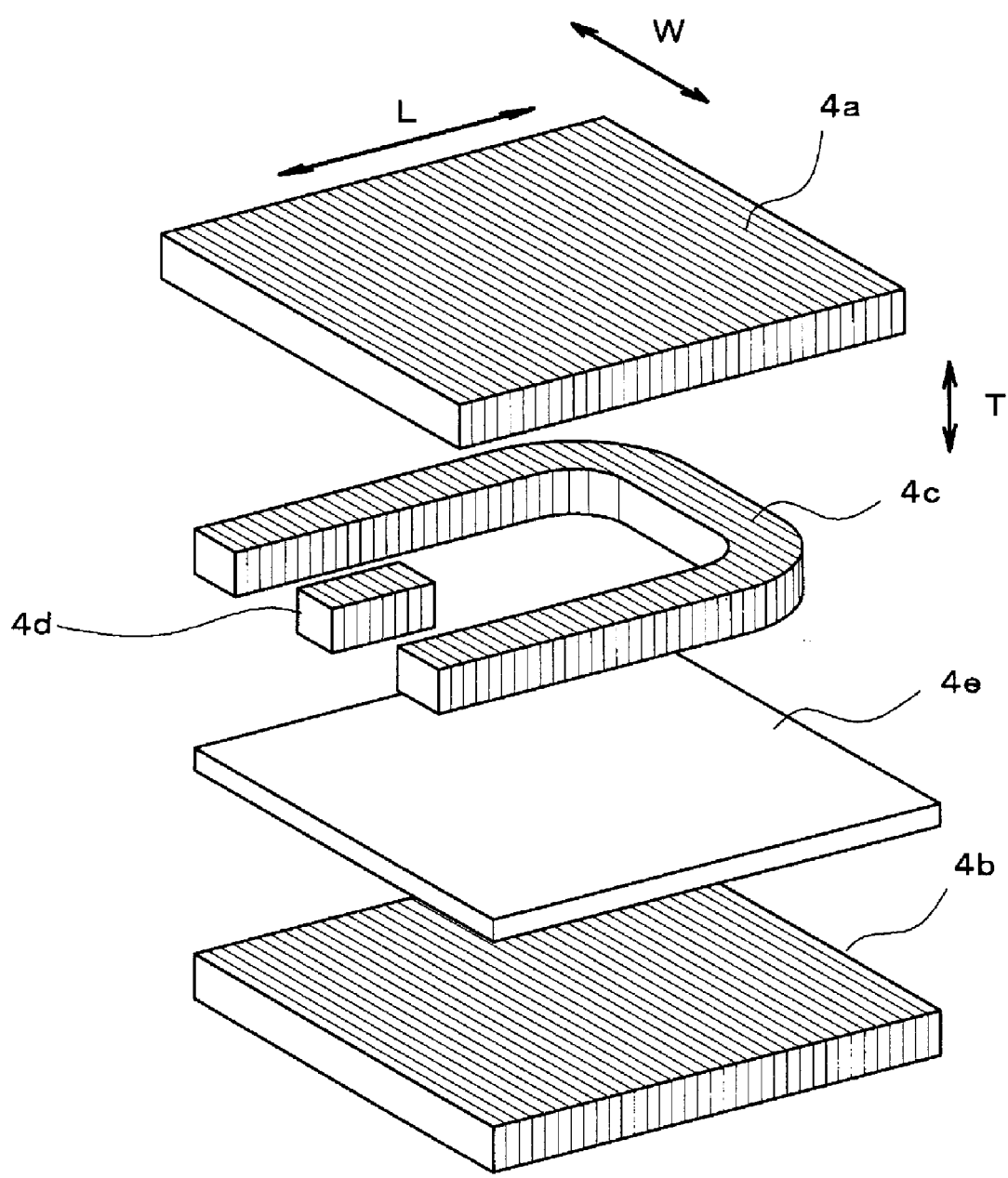
FIG. 4 is an explanatory diagram of the sheet-like fibrous structure before stacked.
Figure 5:
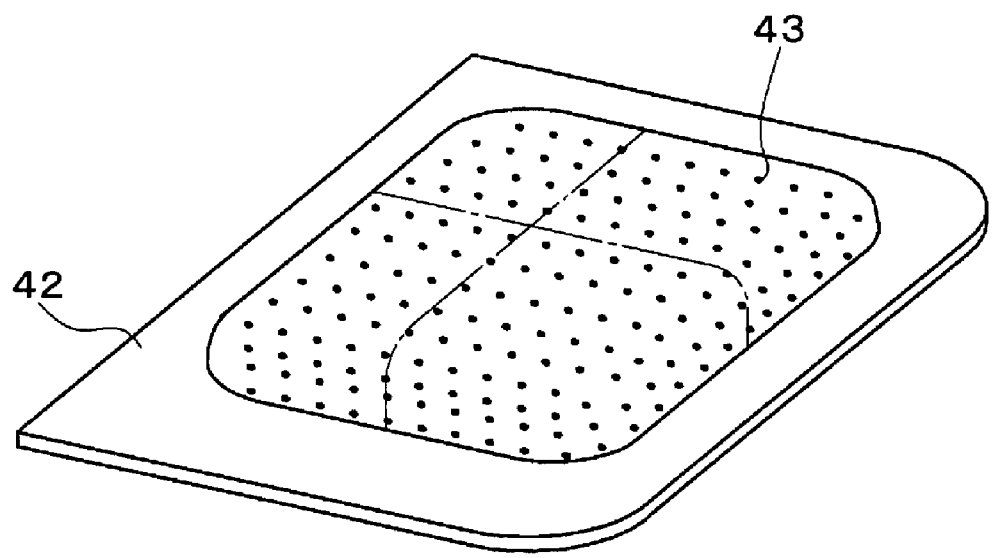
FIG. 5 is an explanatory view of a mold.
Figure 5:
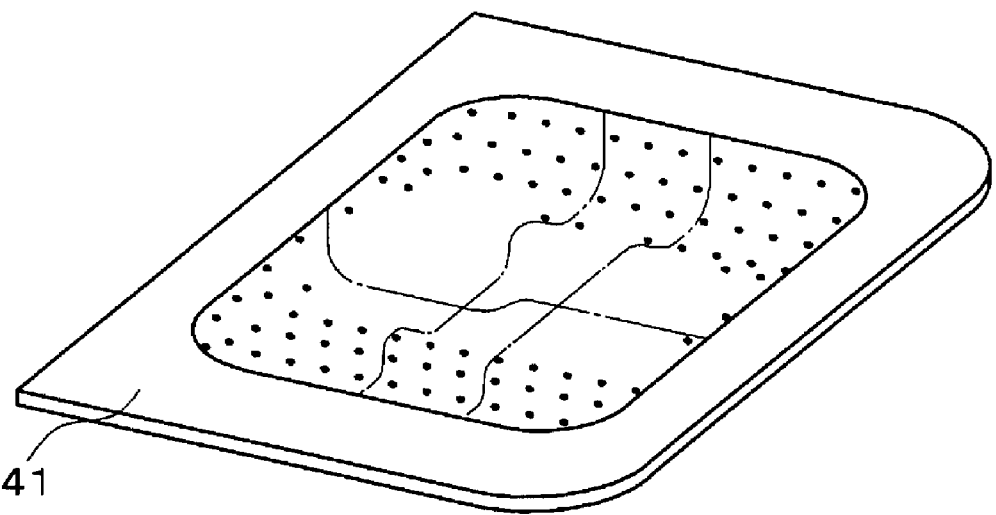
Figure 6:
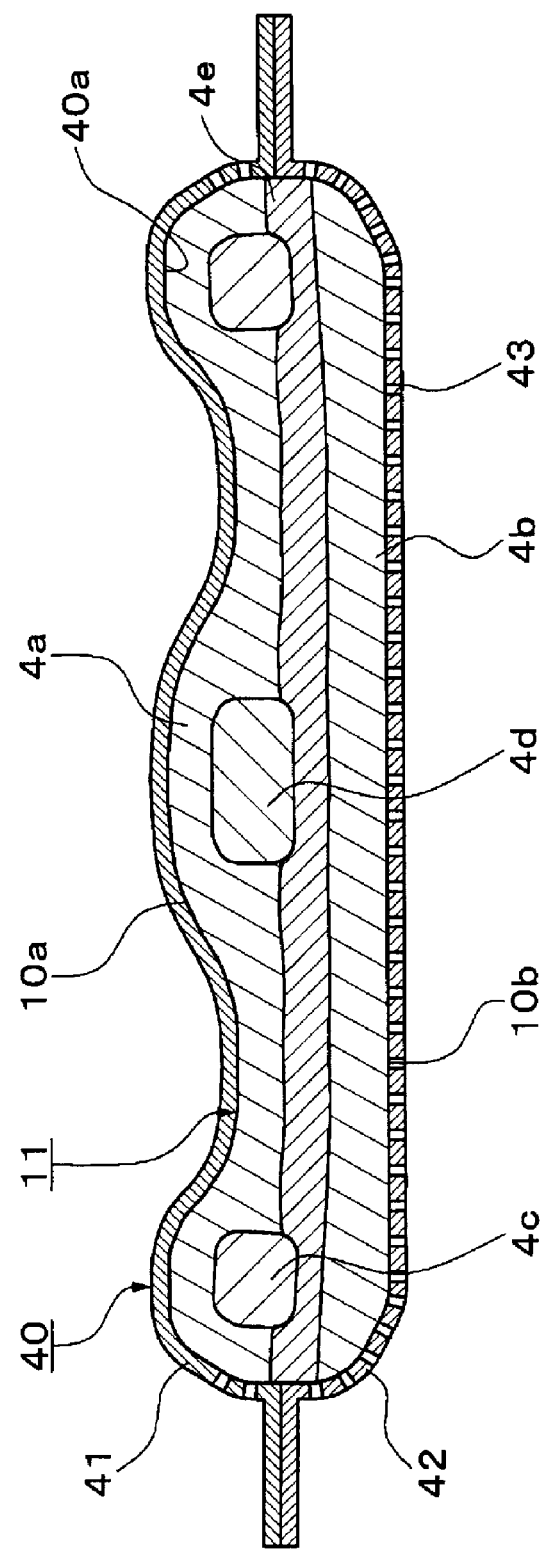
FIG. 6 is an explanatory diagram of a manufacturing step of a cushion body.
Figure 7:
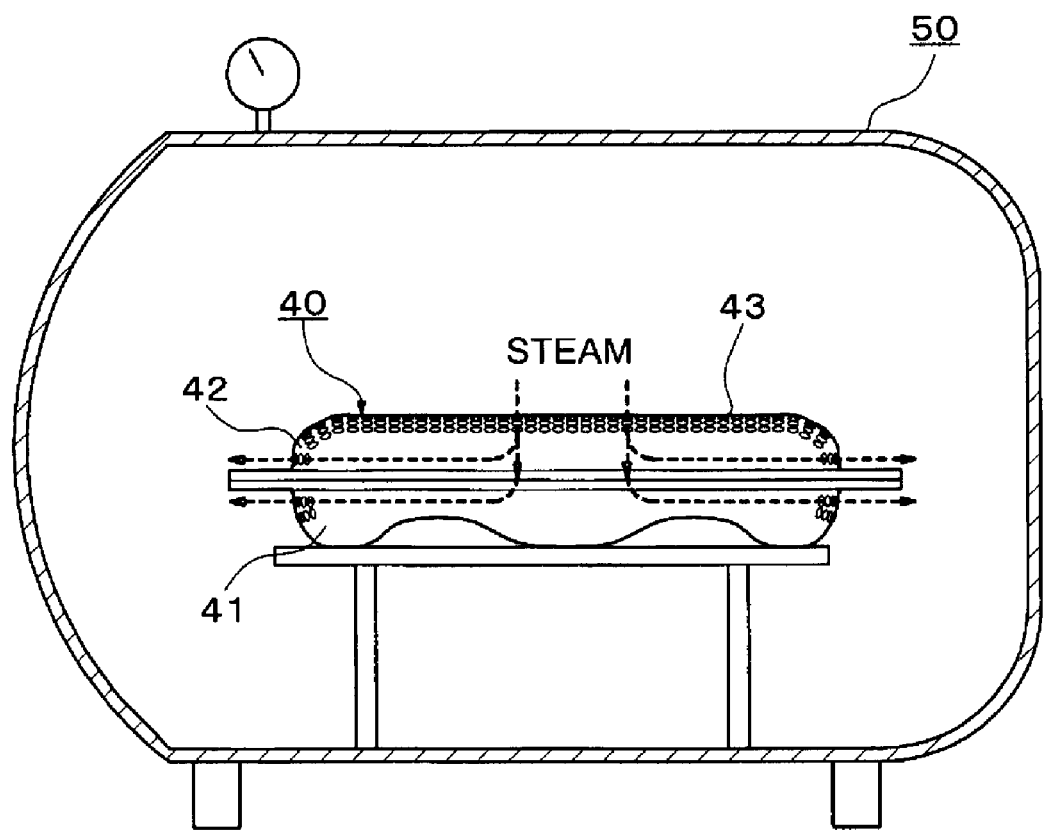
FIG. 7 is an explanatory diagram of a manufacturing step of the cushion body.
Figure 8:
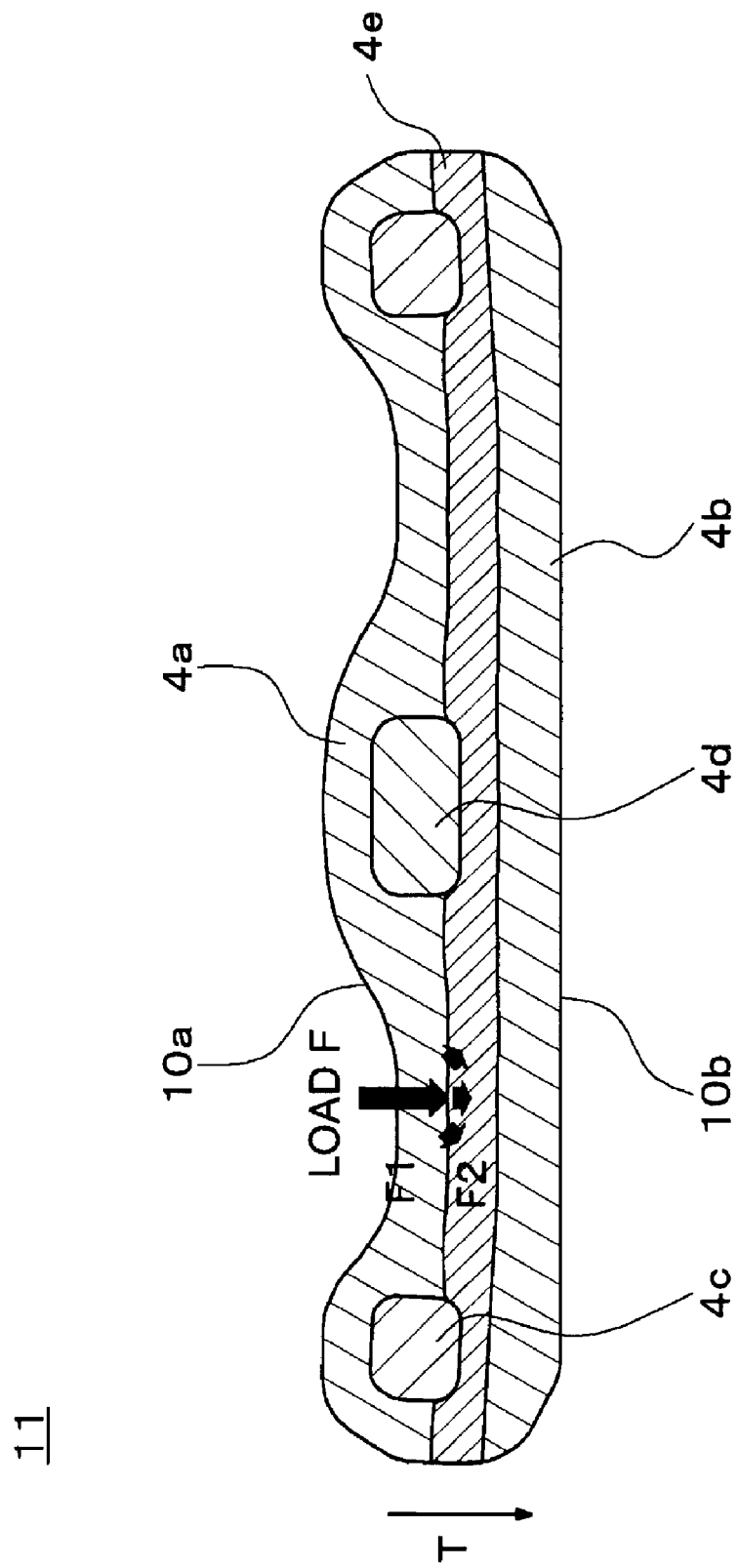
FIG. 8 is a sectional explanatory diagram of the cushion body.

FIG. 1 to FIG. 8 show an embodiment of the present invention, FIG. 1 being an explanatory diagram of a seat, FIG. 2 being an explanatory diagram of a fiber direction in a web, FIG. 3 being an explanatory diagram of a manufacturing step of a sheet-like fibrous structure, FIG. 4 being an explanatory diagram of the sheet-like fibrous structure before stacked, FIG. 5 being an explanatory diagram of a mold, FIG. 6 and FIG. 7 being explanatory diagrams of a manufacturing step of a cushion body, and FIG. 8 being a sectional explanatory diagram of the cushion body.

A seat 1 of the embodiment can be applied to a seat for a vehicle, a train, an airplane or the like, and it may be also applied to various chairs such as a business chair or a care chair. The seat 1 of this embodiment is provided with a seat portion 10 and a seat back portion 20, as shown in FIG. 1. The seat portion 10 and the seat back portion 20 are respectively constituted such that cushion bodies 11 and 21 are placed on seat frames 15 and 25 and the cushion bodies 11 and 21 are coated with covers 13 and 23.

Regarding the cushion body of this embodiment, a forming step (a cushion body forming step) thereof will be explained taking the cushion body 11 of the seat portion 10 as an example. The cushion body 21 is also formed according to a similar method as the above. The cushion body 11 in this embodiment is formed by forming a sheet-like fibrous structure as a fibrous structure where a web 2 has been folded in a standing state (a fibrous structure forming step) described later, cutting this sheet-like fibrous structure into fibrous structure pieces with predetermined shapes to stack a plurality of cut fibrous structure pieces and disposing the plurality of cut fibrous structure pieces in a mold 40 formed with a plurality of steam holes 43 which are air holes on its mold face (a fibrous structure disposing step), and performing high pressure steam molding in high pressure steam molding machine 50 in which the mold 40 has been clamped (a molding step).

First, the web 2 for forming the cushion body 11 of this embodiment will be explained with reference to FIG. 2 and FIG. 3. The web 2 is one obtained by dispersing and mixing matrix fibers composed of assemblies of inelastic crimped short fibers, and thermally adhesive composite short fibers having a melting point lower than that of the inelastic crimped short fibers and having a melting point of at least 120° C. as an adhesive component.

The web 2 in this embodiment is one obtained by performing cotton blending of inelastic polyester crimped short fibers as the inelastic crimped short fibers and the thermally adhesive composite short fibers composed of thermoplastic elastomer having a melting point lower than a melting point of polyester polymer constituting the inelastic polyester crimped short fibers by 40° C. and inelastic polyester such that the fibers are mainly directed in a longitudinal direction of the web 2. The web 2 of this embodiment has a bulk property of at least 30 kg/m$^3$ and it is formed with cubic fiber crossing points between the thermally adhesive composite short fibers and between the thermally adhesive composite short fibers and the inelastic polyester crimped short fibers.

In this embodiment, hollow polyethylene terephthalate fibers with a single yarn fineness of 12 deniers and a fiber length of 64 mm, which have a cubic crimp due to anisotropic cooling are used as the inelastic polyester crimped short fibers. As the inelastic polyester crimped short fibers, the short fibers are made from ordinary polyethylene terephthalate, polytrimethylene terephthalate, polybutylene terephthalate, polyhexamethylene terephthalate, polytetramethylene terephthalate, poly-1,4-dimethylcyclohexane terephthalate, polypivalolactone, or copolymer ester thereof, cotton blended material of these fibers, composite fibers composed of two or more kinds of the above polymer components, or the like can be used. Short fibers of polyethylene terephthalate, polytrimethylene terephthalate, or polybutylene terephthalate of these short fibers are desirable. Further, potential crimped fibers composed of two kinds of polyethylene terephthalate and polytrimethylene terephthalate whose inherent viscosities are different from each other or a combination thereof, where crimps have micro-crimps due to heat treatment or the like can also be used.

Further, a sectional shape of the short fiber may be circular, oval, hyterotypic, or hollow. A thickness of this short fiber is in a range of 2 to 200 deniers, especially, preferably in a range of 6 to 100 deniers. Incidentally, when the thickness of the short fiber is small, softness increases, but elasticity of the cushion body often lowers.

Further, when the thickness of the short fiber is excessively thick, handling easiness, especially, formability of the web 2 deteriorates. Furthermore, there is a possibility that, as the number of constituent fibers decreases excessively, the number of crossing points formed between the short fibers and the thermally adhesive composite short fibers also decreases so that elasticity of the cushion body is hard to develop and simultaneously durability lowers. Furthermore, texture becomes excessively rough and hard.

In the embodiment, as the thermally adhesive composite short fibers, core/sheath type thermally melting composite fibers (a core/sheath ratio=60/40: weight ratio) with a single yarn fineness of 6 deniers and a fiber length of 51 mm, which uses thermoplastic polyether ester elastomer with a melting point of 154° C. as a sheath component and uses polybutylene terephthalate with a melting point of 230° C. as a core component are used.

The thermally adhesive composite short fibers are composed of thermoplastic elastomer and inelastic polyester. Then, it is preferable that the former occupies at least ½ of a fiber surface. Regarding a weight ratio, it is appropriate that the former and the latter are in a range of 30/70 to 70/30 in a composite ratio. The thermally adhesive composite short fibers may be of a side by side type or of a sheath-core type, but the latter is desirable. In the sheath-core type, the inelastic polyester constitutes the core, but the core may be concentric or eccentric. Especially, the eccentric type is more desirable because coil-like elastic crimps are developed.

As the thermoplastic elastomer, polyurethane elastomer or polyester elastomer is desirable. Especially, the latter is appropriate. As the polyurethane elastomer, polyol with a low melting point having a molar weight of about 500 to 6000, for example, dihydroxy polyether, dihydroxy polyester, dihydroxy polycarbonate, dihydroxy polyester amide, or the like, organic diisocyanate with a molar weight of 500 or less, for example, p,p-diphenylmethane diisocyanate, tolylene diisocyanate, isophorone diisocyanate, diphenylmethane diisocyanate hydride, xylylene diisocyanate, 2,6-diisocyanate methyl caproate, hexamethylene diisocyanate, or the like, chain extender with a molar weight of 500 or less, for example, polymer obtained by reaction with glycol, amino alcohol, or triol are used. An especially desirable one of these polymers is polytetramethylene glycol as polyol, or polyurethane using poly-ε-caprolactone or polybutylene adipate. In this case, p, p'-diphenylmethane diisocynate is desirable as an organic diisocyanate. Further, p, p'-bidihydroxy-ethoxy benzene and 1,4-butane diol are desirable as the chain extender.

On the other hand, as the polyester elastomer, polyether ester block copolymer obtained by performing copolymerization using thermoplastic polyester as a hard segment and using poly (alkylene oxide) glycol as a soft segment, more specifically, ternary copolymer composed of at least one of dicarboxylic acids selected from aromatic dicarboxylic acid such as terephthalic acid, isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, or 3-sodium sulfoisophthalic acid, alicyclic dicarboxylic acid such as 1,4-cyclohexane dicarboxylic acid, aliphatic dicarboxylic acid such as succinate, oxalic acid, adipic acid, sebacic acid dodecanedioic acid, dimer acid, ester-forming derivatives thereof, or the like; at least one of diol components selected from aliphatic diol such as 1,4-butane diol, ethylene glycol, trimethylene glycol, tetramethylene glycol, pentamethylene glycol, hexamethylene glycol, neopentyl glycol, or decamethylene glycol, or alicyclic diol such as 1,1-cyclohexan dimethanol, 1,4-cyclohexan dimethanol, or tricyclodecane dimethanol, ester-forming derivatives thereof, or the like; and at least one of poly (alkylene oxide) glycol such as polyethylene glycol, poly (1,2- and 1,3-propylene oxide) glycol, poly (tetramethylene oxide) glycol, copolymer of ethylene oxide and propylene oxide, copolymer of ethylene oxide and tetrahydrofuran, or the like, where an average molecular weight is in a range of about 400 to 5000 is used.

Considering the aspect of the adhesiveness, temperature property, and strength of the inelastic polyester crimped short fibers, block copolymerization polyether polyester using polybutylene terephthalate as a hard segment and using polyoxybutylene glycol as a soft segment is desirable. In this case, the polyester component constituting the hard segment includes terephthalic acid as the main acid component, and polybutylene terephthalate which is butylene glycol component as the main diol component. Of course, a portion (generally, 30 mol % or less) of this acid component may be replaced with another dicarboxylic acid component or oxycarboxylic acid component, and similarly a portion (generally, 30 mol or less) of the glycol component may be replaced with a dioxy component other than the butylene glycol component.

Further, the polyether portion constituting the soft segment may be polyether replaced with a dioxy component other than butylene glycol. Incidentally, various stabilizers, ultraviolet absorbent, thickening branching agent, delusterant, colorant, or other various improvers or the like may be blended in the polymer according to necessity.

It is preferable that the degree of polymerization of the polyester elastomer is in a range of 0.8 to 1.7 dl/g, especially, in a range of 0.9 to 1.5 dl/g regarding inherent viscosity. If this inherent viscosity is excessively low, a heat adhesion spot formed by the inelastic polyester crimped short fibers constituting the matrix is made breakable. On the other hand, if the inherent viscosity is excessively high, a spindle-shaped node becomes hard to be formed at a heat adhesion time.

As basic characteristics of the thermoplastic elastomer, a fracture elongation is preferably 500% or more, more preferably, 800% or more. If this elongation is excessively low, when the cushion body 11 is compressed and the deformation reaches the heat adhesion point, the coupling at this portion becomes breakable.

On the other hand, an elongation stress of the thermoplastic elastomer at 300% elongation is preferably 0.8 kg/mm$^2$ or less, more preferably, 0.8 kg/mm$^2$. If this stress is excessively large, it becomes hard for the heat-adhesion spot to disperse force applied on the cushion body 11, so that, when the cushion body 11 is compressed, the heat-adhesion spot may be broken by the force applied at that time, or even if it is not broken, the inelastic polyester crimped short fibers constituting the matrix may be also strained or crimps may fatigue.

Further, the elongation recovery ratio of the thermoplastic elastomer at 300% elongation is preferably 60% or more, more preferably, 70% or more. When this elongation recovery ratio is low, even if the cushion body 11 is compressed so that the heat-adhesion spot is deformed, recovery to its original state may become hard. It is required that these thermoplastic elastomers have melting points lower than the polymer constituting the inelastic polyester crimped short fibers and they do not cause crimps of the crimped short fibers to thermally fatigue at a hot-melting processing time for forming the heat-adhesion spot. Therefore, the melting point is preferably lower than the melting point of the polymer constituting the short fibers by 40° C. or more, more preferably, by 60° C. or more. Such a melting point of the thermoplastic elastomer can be set to a temperature in a range of 120 to 220° C., for example.

When the difference in melting point is smaller than 40° C., a heat treatment temperature at a melting processing time described later is excessively high, fatigue of crimps of the inelastic polyester crimped short fibers is caused, which results in lowering of mechanical properties of the crimped short fibers. Incidentally, regarding the thermoplastic elastomer, when its melting point can not be observed clearly, a softening point thereof is observed instead of the melting point.

On the other hand, as the inelastic polyester crimped short fibers used as a mating component of the thermoplastic elastomer in the composite fibers, polyester polymers constituting the crimped short fibers forming the matrix, such as described above, are adopted, but polyethylene terephthalate, polymethylene terephthalate, or polybutylene terephthalate is more preferably adopted among them.

The above-described composite fibers are dispersed and blended in a range of 20 to 100%, preferably, 30 to 80% based upon weight of the web 2. In the web 2 in this embodiment, the thermally adhesive composite short fibers as the binder fibers and the inelastic crimped short fibers as the main fibers are cotton-blended at a weight ratio of 60:40.

When the dispersion and blend ratio of the composite fibers is excessively low, the number of heat-adhesion spots is reduced, so that the cushion body 11 may become easily deformable, or elasticity, repulsive property, and durability may lower. Further, cracks between tops arranged may occur.

In the embodiment, the inelastic polyester crimped short fibers and the thermally adhesive composite short fibers are cotton-blended at the weight ratio of 40:60, and they are formed in the web 2 of coating weight 20 g/m² through a roller card.

The web 2 in this embodiment is formed such that a ratio of fibers oriented in the lengthwise direction of the web is relatively higher than that of fibers oriented in a lateral direction. That is, the web 2 in this embodiment is formed so as to satisfy a relationship of $C \geq 3D/2$, preferably, $C \geq 2D$ per unit volume. When the total numbers of the fibers C oriented in the lengthwise direction (a continuous direction) in this continuous web 2 and the fibers D oriented in the lateral direction (a widthwise direction of the web) are examined, it can be confirmed that C:D=2:1.

Here, as shown in FIG. 2, the fibers oriented in the lengthwise direction of the web 2 are fibers satisfying such a condition that an angle θ of the lengthwise direction of the fibers to the lengthwise direction of the web is in a range of $0° \leq \theta \leq 45°$, while the fibers oriented in the lateral direction (the widthwise direction of the web) are fibers satisfying such a condition that the angle θ is in a range of $45° < \theta \leq 90°$. In the figure, reference symbol a represents fibers constituting the web, reference symbol b represents the lengthwise direction (extending direction) of the web, and reference symbol c represents the fiber direction constituting the web. Further, regarding the orientation of the fibers constituting the sheet-like fibrous structure, a thickness direction of the sheet-like fibrous structure and a direction extending along a direction perpendicular to a thickness direction thereof mean directions within a range of ±45° to these directions.

A direction where each fiber direction can be observed by extracting random portions in a surface layer portion and an inner layer portion of the web 2 to observe them using a transmission type optical microscope. Incidentally, the thickness of the web 2 is 5 mm or more, preferably, 10 mm or more, further preferably 20 mm or more. Generally, the web 2 has a thickness of 5 to 150 mm.

Next, the web 2 formed such that fibers mainly extend along the lengthwise direction is folded like an accordion such that it has a predetermined density and a desired thickness as a structural body, so that cubic fiber crossing points are formed between the composite fibers and between the inelastic polyester crimped short fibers and the composite fibers, and heat treatment is then performed at a temperature (to 80° C.) lower than the melting point of the polyester polymer and higher than the melting point (or a fluidization start point) of the thermoplastic elastomer, so that elastomer components are melt-adhered at the fiber crossing points and flexible heat-adhesion spots are formed.

Specifically, as shown in FIG. 3, the web 2 is folded to an accordion shape by pushing the web 2 into a hot-air suction type heat treatment machine 62 (a length of a heat treatment zone is 5 m and a moving velocity is 1 m/min) by a driving roller 61 with a roller surface velocity of 2.5 m/min and it is formed in a heat-adhered sheet-like fibrous structure with a thickness of 25 mm by treating the web 2 at 190° C. for 5 minutes using Struto equipment (a fibrous structure forming step).

Adhesion spots thermally adhering in a state the thermally adhesive composite short fibers have crossed one another and adhesion spots thermally adhering in a state that the thermally adhesive composite short fibers and the inelastic crimped short fibers have crossed one another are dispersed in the sheet-like fibrous structure thus formed. It is appropriate for developing cushioning properties, ventilation properties, and elasticity that the density of the sheet-like fibrous structure is in a range of 5 to 200 kg/m³.

By forming the web 2 formed such that their fibers extend along the lengthwise direction in a folding manner, the sheet-like fibrous structure is formed such that the number of fibers oriented in the thickness direction is larger than that of fibers oriented in a direction perpendicular to this thickness direction and a direction of the fibers mainly becomes parallel to the thickness direction. That is, the sheet-like fibrous structure in the embodiment is formed such that when the total number of fibers arranged along in the thickness direction is represented as A and the number of fibers arranged along the direction perpendicular to the thickness direction is represented as B regarding per unit volume, a relationship of $A \geq 3B/2$, preferably, $A \geq 2B$ is satisfied.

Next, the sheet-like fibrous structure is cut in a predetermined shape, and cut pieces are stacked in a vertical direction (a thickness direction T), as shown in FIG. 4. In this embodiment, four kinds of sheet-like fibrous structures 4a to 4d including a first sheet-like fibrous structure 4a, a second sheet-like fibrous structure 4b, a U-shaped sheet-like fibrous structure 4c with a U shape for forming a bank portion of the cushion body 11, a protrusion-shaped sheet-like fibrous structure 4d for forming a protrusion portion to be slightly protruded between both thighs of a seat occupant, and a load receiving member 4e are respectively cut in predetermined shapes, the U-shaped sheet-like fibrous structure 4c, the protrusion-shaped sheet-like fibrous structure 4d, and the load receiving member 4e are sandwiched between the first sheet-like fibrous structure 4a and the second sheet-like fibrous structure 4b. Incidentally, a widthwise direction of the cushion body 11, a lengthwise direction thereof, and a thickness direction thereof are represented as W, L, and T in FIG. 4, respectively.

In this embodiment, the first sheet-like fibrous structure 4a and the second sheet-like fibrous structure 4b having equivalent fiber material and fiber density to those of the first sheet-like fibrous structure 4a are stacked. It is preferable that the fiber density of the first sheet-like fibrous structure 4a and the second sheet-like fibrous structure 4b is in a range of 10 to 35 kg/m³ before thermal molding. Incidentally, the first sheet-like fibrous structure 4a and the second sheet-like fibrous structure 4b correspond to the fibrous structure of an embodiment of the present invention.

As described above, the first sheet-like fibrous structure 4a is formed of a sheet-like fibrous structure obtained by folding the web 2 obtained by blending the main fibers and the binder fibers in a standing state. The first sheet-like fibrous structure 4a is arranged on a side (an upper side on FIG. 4) of a sitting surface 10a of the seat 1, and it serves to receive load from a body of a seat occupant directly or indirectly via a cover.

The second sheet-like fibrous structure 4b is formed of a sheet-like fibrous structure made from substantially the same fiber material as that of the first sheet-like fibrous structure 4a. The second sheet-like fibrous structure 4b is arranged on the side (a lower side in FIG. 4) of the seat frame 15 of the seat 1.

Between the first sheet-like fibrous structure 4a and the second sheet-like fibrous structure 4b, the load receiving member 4e as an intermediate layer is disposed. The load receiving member 4e is a flat-plate state member and serves to support load in the thickness direction T generated by sitting of a seat occupant on the sitting surface 10a and to disperse it. The load receiving member 4e is formed by a material whose flexing degree to load in the thickness direction T is smaller than that of the first sheet-like fibrous structure 4a and the second sheet-like fibrous structure 4b. As a material of the load receiving member 4e, resins such as a polyester elastomer may be used. As a form of the load receiving member 4e, fibers durable to the thickness direction, potential crimped fibers, fiber sheets obtained by machining a felt-like fiber manufactured by Struto equipment in a plate state, or a resin molded product obtained by molding the resin in a plate state may be used.

Between the first sheet-like fibrous structure 4a and the load receiving member 4e, the U-shaped sheet-like fibrous structure 4c and the protrusion-shaped sheet-like fibrous structure 4d are disposed. The U-shaped sheet-like fibrous structure 4c is a fibrous structure for forming a bank portion of the cushion body 11, which will be described later, and the protrusion-shaped sheet-like fibrous structure 4d is a fibrous structure for forming a protrusion portion of the cushion body 11.

These sheet-like fibrous structures 4a to 4d and the load receiving member 4e are stacked in their thickness direction T. That is, stacking is performed such that a direction of fibers extends in a vertical direction. Further, holt-melt films, hot-melt unwoven cloths, hot-melt adhesives, or the like are arranged at portions where the sheet-like fibrous structures 4a to 4d abut on one another and portions where the sheet-like fibrous structures 4a to 4d and the load receiving member 4e abut on one another according to necessity.

The sheet-like fibrous structures 4a to 4d and the load receiving member 4e thus stacked are arranged in a mold 40 such as shown in FIG. 5 and compressed (a fibrous structure arranging step). The mold 40 of this embodiment is composed of a first mold 41 and a second mold 42. The first mold 41 is a mold used to form a shape of the cushion body 11 positioned on the side of the sitting surface 10a (namely, a surface), while the second mold 42 is a mold used to form a shape of the cushion body 11 positioned on the side of the seat frame 15, namely, on the side of a back surface 10b (a non-load receiving face). When the first mold 41 and the second mold 42 are fastened, a cavity 40a having a desired undulation shape of the cushion body 11 is formed. Further, steam holes 43 are formed on a portion or a whole of a mold face of the mold 40. In the embodiment, the steam holes are hardly formed on the first mold 41 while a plurality of steam holes 43 are bored over a whole face of the second mold 42 in the second mold 42. The mold 40 can be formed using such metal as iron, steel, aluminum, glass fiber, or carbon fiber, or it may be formed of any synthetic resin.

FIG. 6 is a sectional view of a state that the sheet-like fibrous structures 4a to 4d and the load receiving member 4e have been disposed in the mold 40 and the mold 40 has been fastened. The sheet-like fibrous structures 4a to 4d are formed to be larger than the cavity 40a of the mold 40 in a natural state by about 1.2 to 3.0 times in volume. Accordingly, the sheet-like fibrous structures 4a to 4d and the load receiving member 4e are changed to a state that they have been compressed to the shape of the cavity 40a at a mold fastening time.

The first sheet-like fibrous structure 4a is received in the cavity 40a such that an upper face thereof abuts on an inner wall face of the first mold 41. Further, the second sheet-like fibrous structure 4b is arranged in the cavity 40a such that a lower face thereof abuts on an inner wall portion of the second mold 42. The load receiving member 4e is disposed between the first sheet-like fibrous structure 4a and the second sheet-like fibrous structure 4b. The U-shaped sheet-like fibrous structure 4c and the protrusion-shaped sheet-like fibrous structure 4d are disposed between the first sheet-like fibrous structure 4a and the load receiving member 4e.

Next, as shown in FIG. 7, the mold 40 in which the sheet-like fibrous structures 4a to 4d and the load receiving member 4e have been disposed is entered into a high pressure steam molding machine 50. A steam introducing port (not shown) is formed on an upper portion of the high pressure steam molding machine 50, so that high pressure steam can be introduced from the outside of the high pressure steam molding machine 50 into the high pressure steam molding machine 50. The mold 40 is installed in the high pressure steam molding machine 50 such that the second mold 42 is directed vertically upwardly and the first mold 41 is directed vertically downwardly. After steam is blown to the mold 40, cooling and mold-releasing are performed to obtain the cushion body 11 (cooling and mold-releasing step).

In the molding step of this embodiment, a temperature inside the high pressure steam molding machine 50 is controlled such that steam with a molding temperature can be blown to the molding 40. Here, the molding temperature is a temperature higher than a melting point of the thermally adhesive composite short fibers serving as the binder fibers, namely, higher than a melting point of thermoplastic elastomer, and lower than a melting point of matrix fibers (the inelastic crimped short fibers) serving as the main fibers. In order to raise a temperature of steam to the molding temperature, a temperature inside the high pressure steam molding machine 50 is first raised to the molding temperature by a heater (not shown) and a pressure inside the high pressure steam molding machine 50 is raised from an ambient atmospheric pressure (about 1 atm) to at least saturated steam pressure of steam or higher in the molding temperature.

In this embodiment, since the melting point of the binder fibers is about 154° C., the molding temperature is set to 161° C. that is higher than the melting point. In this embodiment, then, since water vapor ($H_2O$) serving as heat conduction material is blown to the mold 40, the temperature inside the high pressure steam molding machine 50 is raised up to the molding temperature of 161° C. in about 30 seconds and the pressure inside the high pressure steam molding machine 50 is raised to atmospheric pressure of about 5.5 atm (about 0.557 MPa) which is a boiling point at the molding temperature of 161° C. That is, the saturated steam pressure at the molding temperature of 161° C. is about 5.5 atm.

In the molding step, water vapor with the molding temperature is blown to the mold 40 in a state that the temperature and the pressure inside the high pressure steam molding machine 50 have been kept in the molding temperature and a predetermined pressure. In this embodiment, molding is performed by blowing steam to the mold 40 for about one minute and 10 seconds. Thereafter, the temperature inside the high pressure steam molding machine 50 is lowered to the molding temperature or lower in about one minute and the pressure inside the high pressure steam molding machine 50 is reduced to an ambient atmospheric pressure. Then, the mold 40 is taken out of the high pressure steam molding machine 50 to be cooled (a cooling step), and the cushion body 11 thermally molded is released from the mold 40 (a mold-releasing step). In this embodiment, tact time for thermally molding the cushion body 11 in the high pressure steam molding machine 50 can be set to about 3 to 5 minutes.

By blowing steam at the molding temperature to the mold in this manner, steam enters in the sheet-like fibrous structures 4a to 4d having ventilation properties from steam holes 43 of the mold 40, and it exits from other steam holes 43 to the outside of the mold 40. The sheet-like fibrous structures 4a to 4d are disposed in the mold 40 in their compressed state, and crossing points between the thermally adhesive composite short fibers and between the thermally adhesive composite short fibers and the inelastic crimped short fibers are caused to thermally adhere to one another due to steam heat so that the cushion body is formed in the shape of the cavity 40*a* of the mold 40.

Further, hot-melt films, hot-melt unwoven clothes, hot-melt adhesives, or the like disposed among the sheet-like fibrous structures 4*a* to 4*d* as well as the sheet-like fibrous structures 4*a* to 4*d* and the load receiving member 4*e* are melted due to steam heat and the sheet-like fibrous structures 4*a* to 4*d* as well as the sheet-like fibrous structures 4*a* to 4*d* and the load receiving member 4*e* are fixed to one another. Thus, fibers in the sheet-like fibrous structures 4*a* to 4*d* are caused to thermally adhere to one another due to steam and the sheet-like fibrous structures 4*a* to 4*d* as well as the sheet-like fibrous structures 4*a* to 4*d* and the load receiving member 4*e* are fixed to one another by the hot-melt film, a hot-melt unwoven cloth, hot-melt adhesive, or the like, so that a cushion body 11 with a predetermined shape is formed. Incidentally, dish cloth may be inserted on a surface according to necessity, or wires made from steel or the like may be inserted among the sheet-like fibrous structures 4*a* to 4*d* as well as the sheet-like fibrous structures 4*a* to 4*d* and the load receiving member 4*e*.

When steam at the molding temperature is blown to the mold 40 inside the high pressure steam molding machine 50 raised up to the saturated steam pressure like this embodiment, a molding time can be largely reduced. That is, since steam at the molding temperature has a thermal capacity larger than that of hot air, the binder fibers can be melted in a short time.

Incidentally, when high pressure steam is blown to the mold under atmospheric pressure, since the high pressure steam adiabatically expands immediately and a temperature of the steam lowers, it is difficult to cause steam at the molding temperature to reach inside of the fiber bodies. Therefore, a long molding time is required notwithstanding. Further, in this embodiment, by largely shortening the molding time, a time when fibers are exposed to heat is shortened so that texture of the cushion body 11 molded is made excellent.

In the cushion body 11 of this embodiment, the sheet-like fibrous structures 4*a* to 4*d*, where the directions of fibers are oriented in the thickness direction T, are stacked and the high pressure steam molding is performed. Accordingly, the fibers constituting the cushion body 11 are arranged along a direction in which load acts when a seat occupant sits on the seat 1. With such a constitution, the cushion body 11 in this embodiment has ventilation properties and can secure a proper hardness to a stress direction, and it provides dispersibility of stress and excellent durability.

Further, the cushion body 11 in this embodiment is molded in a state that it has been compressed by the mold 40, and it can take a three-dimensional and complicated undulation shape so as to conform with the shape of the cavity 40*a* of the mold 40. At this time, a cushioning feeling can be adjusted partially according to a compression degree in the mold 40.

The mold 40 in this embodiment is arranged such that the second mold 42 is oriented vertically upwardly, namely, to the side of the steam introducing port. Further, formation is made such that the steam holes 43 of the second mold 42 outnumber the steam holes 43 of the first mold 41. Therefore, an amount of steam introduced from the steam holes 43 of the second mold 42 into the cavity 40*a* is more than the amount of steam introduced from the steam holes 43 of the first mold 41. The steam introduced from the steam holes 43 of the second mold 42 is exhausted from the inside of the cavity 40*a* through the steam holes formed on a side face of the second mold 42 or the steam holes formed on a side face of the first mold 41. A flow of this steam is indicated by dotted arrows in FIG. 7. Incidentally, in the mold 40 of this embodiment, any steam hole is not formed in a region of the first mold 41 corresponding to the sitting surface 10*a*. Thereby, it is made possible to reduce the hardness of the sitting surface 10*a* to provide a soft touch feeling to a seat occupant, as described later.

In this embodiment, since the amount of steam introduced from the second mold 42 is more than the amount of steam introduced from the first mold 41, a heat amount supplied to the second sheet-like fibrous structure 4*b* disposed on the side of the second mold 42 is more than a heat amount supplied to the first sheet-like fibrous structure 4*a* disposed on the side of the first mold 41. When the heat amount to be supplied is much, fibers are melted in a short time by the thermal molding and many fibers are fixed due to heat adhesion so that hardness becomes high. On the other hand, steam holes are hardly formed in the first mold 41 at all, and the introduced steam amount is small. Especially, any steam hole is not formed on a region corresponding to the sitting surface. Therefore, the heat amount supplied to the first sheet-like fibrous structure 4*a* is low, and especially, the temperature rise in the region corresponding to the sitting surface becomes very slow. Thus, since the number of fibers fixed by the heat adhesion is reduced in the first sheet-like fibrous structure 4*a*, hardness becomes low.

Further, the load receiving member 4*e* is disposed between the first sheet-like fibrous structure 4*a* and the second sheet-like fibrous structure 4*b*. Since this load receiving member 4*e* is formed by a fibrous structure with a high density or a resin molded product, its ventilation property is poorer than those of the first sheet-like fibrous structure 4*a* and the second sheet-like fibrous structure 4*b*. Thus, since flow of the steam introduced from the side of the second sheet-like fibrous structure 4*b* is blocked by the load receiving member 4*e*, the steam is hardly introduced to the first sheet-like fibrous structure 4*a* but exhausted from steam holes 43 formed on a side face of the second mold 42. Thus, the heat amount supplied to the first sheet-like fibrous structure 4*a* is smaller than that of the heat amount supplied to the second sheet-like fibrous structure 4*b* and thus, the number of fibers melted/fixed by thermal molding is small.

As mentioned above, the first sheet-like fibrous structure 4*a* disposed on the sitting face 10*a* becomes lower in hardness of the entire fibrous structure, particularly on surface layer hardness, than the second sheet-like fibrous structure 4*b*, and a flexing degree of the former in the thickness direction T to a load due to sitting of a seat occupant becomes large. On the other hand, since the second sheet-like fibrous structure 4*b* becomes higher in hardness than the first sheet-like fibrous structure 4*a*, durability to weight in the thickness direction due to sitting can be improved. Thus, according to the cushion body molding step of this embodiment, a cushion body 11 including both a soft touch feeling during sitting and durability to load due to sitting can be provided.

FIG. 8 is a sectional view of the cushion body 11 released from the mold. FIG. 8 shows a sectional shape obtained by cutting the cushion body 11 of the seat 1 shown in FIG. 1 along a direction of arrow line A-A'. As shown in this figure, the cushion body 11 in this embodiment is one thermally molded in a state that the first sheet-like fibrous structure 4*a*, the second sheet-like fibrous structure 4*b*, the U-shaped sheet-like fibrous structure 4*c* with a U shape for forming a bank portion of the cushion body 11, the protrusion-shaped sheet-like fibrous structure 4*d* for forming a protrusion portion to be slightly protruded between both thighs of a seat occupant, and the load receiving member 4e have been stacked in the thickness direction T. Each of the sheet-like fibrous structures 4a to 4d as well as the sheet-like fibrous structures 4a to 4d and the load receiving member 4e are bonded to each other by hot-melt.

In this embodiment, the fiber density of the first sheet-like fibrous structure 4a and the second sheet-like fibrous structure 4b after thermally molded is in a range of about 10 to 35 kg/m$^3$. Since these sheet-like fibrous structures 4a, 4b have a structure where the number of gaps among fibers is large, they are compressed in the thickness direction T and largely flexed when applied with the load in the thickness direction T (arrow F1 in the figure). Thus, the cushion body 11 of this embodiment can give a soft touch feeling to a seat occupant when sitting.

On the other hand, the load receiving member 4e is arranged on the lower face of the first sheet-like fibrous structure 4a and supports the same. Also, the load receiving member 4e is formed by a member whose flexing degree to the load direction is smaller than those of the sheet-like fibrous structures 4a, 4b. Thus, when the first sheet-like fibrous structure 4a is applied with the load in the thickness direction T due to sitting of a seat occupant, the member receives the load in the thickness direction T applied on the first sheet-like fibrous structure 4a and disperses it (arrow F2 in the figure). Thus, the cushion body 11 of this embodiment is hard to fatigue in the load direction and can secure high durability.

Incidentally, in the text, a large flexing degree means a large degree of deformation of the fibrous structure in a load direction to applied load, and specifically it includes both a large compression ratio of compression of the fibrous structure in the load direction to load and a large a degree of bending of the fibrous structure in the load direction. On the contrary, a small flexing degree means a small degree of deformation of the fibrous structure in the load direction to applied load, and specifically it includes both a small compression ratio of compression of the fibrous structure in the load direction to load and a small degree of bending of the fibrous structure in the load direction to load.

The U-shaped sheet-like fibrous structure 4c is disposed between the first sheet-like fibrous structure 4a and the second sheet-like fibrous structure 4b. The U-shaped sheet-like fibrous structure 4c in this embodiment is formed from approximately the same material as that for the first sheet-like fibrous structure 4a or the second sheet-like fibrous structure 4b. Further, the protrusion-shaped sheet-like fibrous structure 4d is similarly disposed between the first sheet-like fibrous structure 4a and the second sheet-like fibrous structure 4b. The protrusion-shaped sheet-like fibrous structure 4d is also formed from approximately the same material as that for the first sheet-like fibrous structure 4a or the second sheet-like fibrous structure 4b. Incidentally, in the cushion body 11 in this embodiment, the bank portion and the protrusion portion are formed using the U-shaped sheet-like fibrous structure 4c and the protrusion-shaped sheet-like fibrous structure 4d, but the bank portion or the protrusion portion may be formed utilizing the shape of the cavity 40a without using these sheet-like fibrous structures.

Further, all of the first sheet-like fibrous structure 4a, the second sheet-like fibrous structure 4b, the U-shaped sheet-like fibrous structure 4c, and the protrusion-shaped sheet-like fibrous structure 4d are formed from the same fiber material. Therefore, when the cushion body 11 is discarded due to damage of the cushion body 11 or duration of life, separation thereof can be saved, so that recycling efficiency is improved. Similarly, it is preferable that these sheet-like fibrous structures 4a to 4d and the load receiving member 4e are formed from the same fiber material. Thereby, recycling efficiency is improved.

Incidentally, in this embodiment, the example that one first sheet-like fibrous structure 4a and one second sheet-like fibrous structure 4b have been stacked as the cushion body 11 is shown, but each or either of the fibrous structures may be stacked in plural. In this case, it is preferable that the number of fibrous structures to be stacked is adjusted according to feeling, durability, size, or the like required for the cushion body 11. For example, when it is desired to improve a feeling of the sitting surface 10a, two or more first sheet-like fibrous structures 4a are stacked. On the contrary, when it is desired to further improve the durability of the cushion body 11, two or more second sheet-like fibrous structures 4b are stacked. Thus, by increasing/decreasing the number of the fibrous structures to be stacked, a cushion body 11 with a desired feeling or durability can be provided. The details will be described below in more detail.

Figure 9:
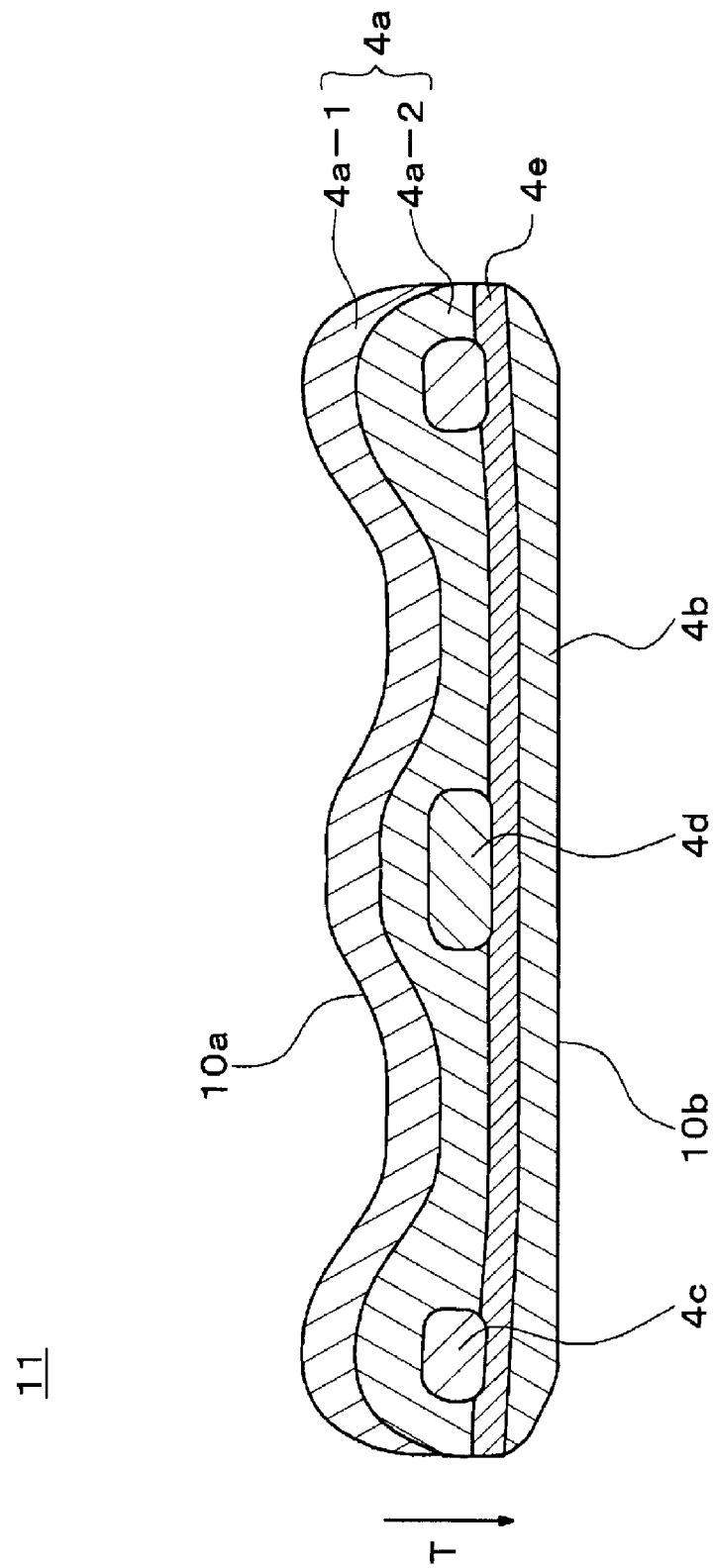
FIG. 9 is a sectional explanatory diagram of the cushion body.
Figure 10:
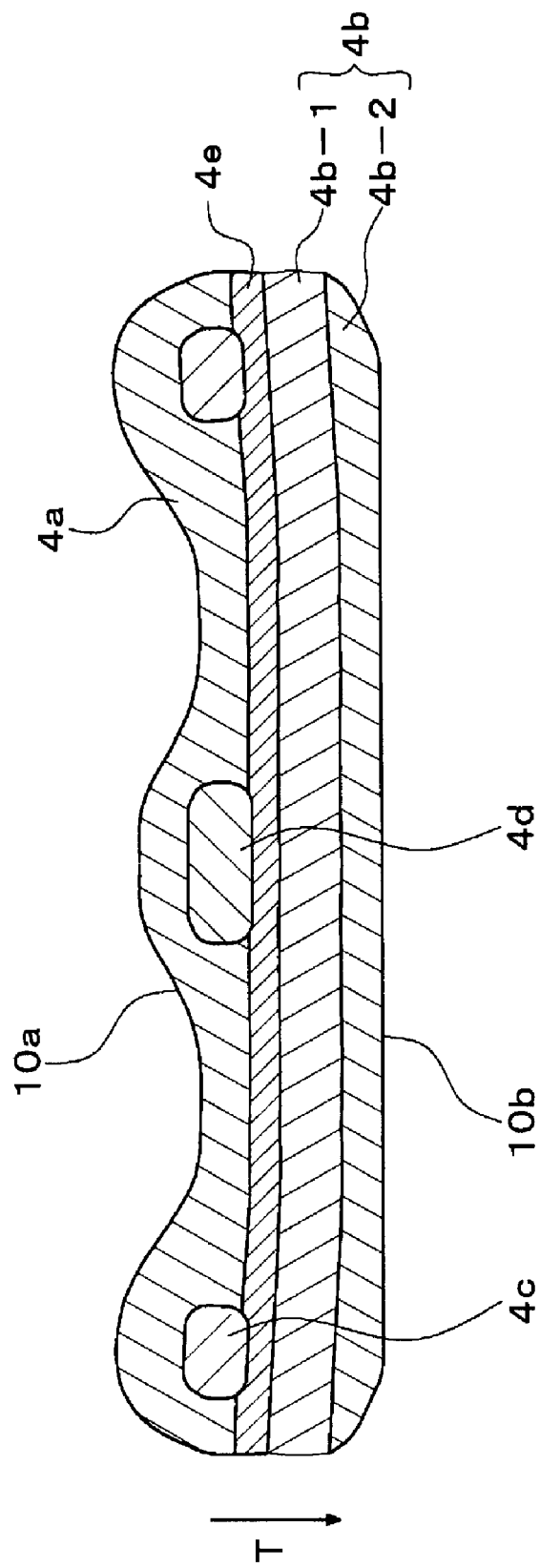
FIG. 10 is a sectional explanatory diagram of the cushion body according to another embodiment.

FIGS. 9 and 10 are sectional explanatory diagrams of the cushion body according to another embodiment. In the cushion body 11 shown in FIG. 9, the first sheet-like fibrous structure 4a is formed by stacking two sheet-like fibrous structures: an upper sheet-like fibrous structure 4a-1 and a lower sheet-like fibrous structure 4a-2. The load receiving member 4e is disposed between the lower sheet-like fibrous structure 4a-2 and the second sheet-like fibrous structure 4b. Since the first sheet-like fibrous structure 4a of this embodiment is formed by stacking the two sheet-like fibrous structures 4a-1, 4a-2, as compared with the cushion body 11 of the first embodiment shown in FIG. 8, the thickness of the first sheet-like fibrous structure 4a between the sitting surface 10a and the load receiving member 4e is doubled. Thus, if a seat occupant is seated, the cushion body flexes in the thickness direction T more largely than the cushion body 11 in the embodiment in FIG. 8, and the cushion body can give a softer touch feeling to the seat occupant when sitting.

On the other hand, if a touch feeling harder than the cushion body 11 in FIG. 9 is desired to be given to the seat occupant, it is only necessary that the thickness of the fibrous structure between the first sheet-like fibrous structure 4a and the load receiving member 4e is reduced. In the cushion body 11 shown in FIG. 10, for example, the first sheet-like fibrous structure 4a is a single piece, while the second sheet-like fibrous structure 4b is formed by stacking two sheet-like fibrous structures: an upper sheet-like fibrous structure 4b-1 and a lower sheet-like fibrous structure 4b-2. The load receiving member 4e is arranged between the first sheet-like fibrous structure 4a and the upper sheet-like fibrous structure 4b-1. By stacking the fibrous structures as above, the thickness of the fibrous structure between the sitting surface 10a and the load receiving member 4e is thinner as compared with the embodiment in FIG. 9, and a hard touch feeling of the load receiving member 4e can be felt more easily when the seat occupant is seated.

As mentioned above, according to the thickness of the fibrous structure between the sitting surface 10a and the load receiving member 4e, the touch feeling received by the seat occupant when sitting can be made different. Specifically, as in the embodiment in FIG. 9, if the thickness of the fibrous structure between the sitting surface 10a and the load receiving member 4e is large, a soft touch feeling can be given to the seat occupant. On the contrary, as in the embodiment in FIG. 10, if the thickness of the fibrous structure between the sitting surface 10a and the load receiving member 4e is small, a hard touch feeling can be given to the seat occupant.

Though the cushion body 11 has been explained above, a cushion body 21 for the seat back portion may be similarly formed. Regarding the cushion body 21, a direction in which load acts when a seat occupant sits is a thickness direction of the cushion 21. Accordingly, in order to secure dispersibility of hardness or stress and durability in a stress direction, a three-dimensional shape can be achieved by stacking sheet-like fibrous structures in a direction in which stress acts and performing high pressure steam forming within the mold 40. Then, a seat 1 is formed by arranging the cushion bodies 11 and 21 thus formed on the sheet frames 15 and 25 and coating them with covers 13 and 23 (an assembling step).

Incidentally, when the cushion body 11 is formed, the cover 13, and the sheet-like fibrous structures 4a to 4d are stacked via hot-melt films, hot-melt unwoven clothes, hot-melt adhesives, or the like, and they are disposed in the mold 40, so that high pressure steam forming may be performed. Thereby, the cover 13 can be formed integrally with the cushion body 11. The cover 23 may be similarly handled.

If the high pressure steam molding is performed in a state that the sheet-like fibrous structures 4a to 4d are coated with the cover 13, the sheet-like fibrous structures 4a to 4d and the cover 13 are arranged in the mold 40, when the molding temperature is excessively high, the cover 13 may lose color. In this case, therefore, the molding temperature may be set to be lower than the melting temperature of the dye dyeing the cover 13.

Further, in the above embodiment, water vapor is blown to the mold 40, but the present invention is not limited to this treatment and heat conducting material which does not adversely affect fibers can be used. That is, steam of the selected heat conducting material can be blown to the mold 40 by raising pressure in the high pressure steam molding machine 50 such that a desired temperature is a boiling point of the selected heat conducting material.

Further, in the embodiment, the cushion body 11 is formed using the sheet-like fibrous structures 4a to 4d formed by folding the web 2 in an accordion shape as the fibrous structures, but the present invention is not limited to this constitution, and a fibrous structure obtained by stacking many webs 2 in the thickness direction can be used as the fibrous structure, or a raw fiber assembly obtained by dispersing and blending main fibers and binder fibers may be used.

Furthermore, in the embodiment, the cushion bodies 11 and 21 obtained by stacking the sheet-like fibrous structures 4a to 4d to perform the high pressure steam forming are used for the seat portion 10 and the seat back portion 20, but the present invention is not limited to this constitution, and a cushion body obtained by stacking sheet-like fibrous structures 4a to 4d to perform high pressure steam forming may be used at a portion on which load due to seat occupant sitting acts such as an arm rest or a head rest.

Figure 11:
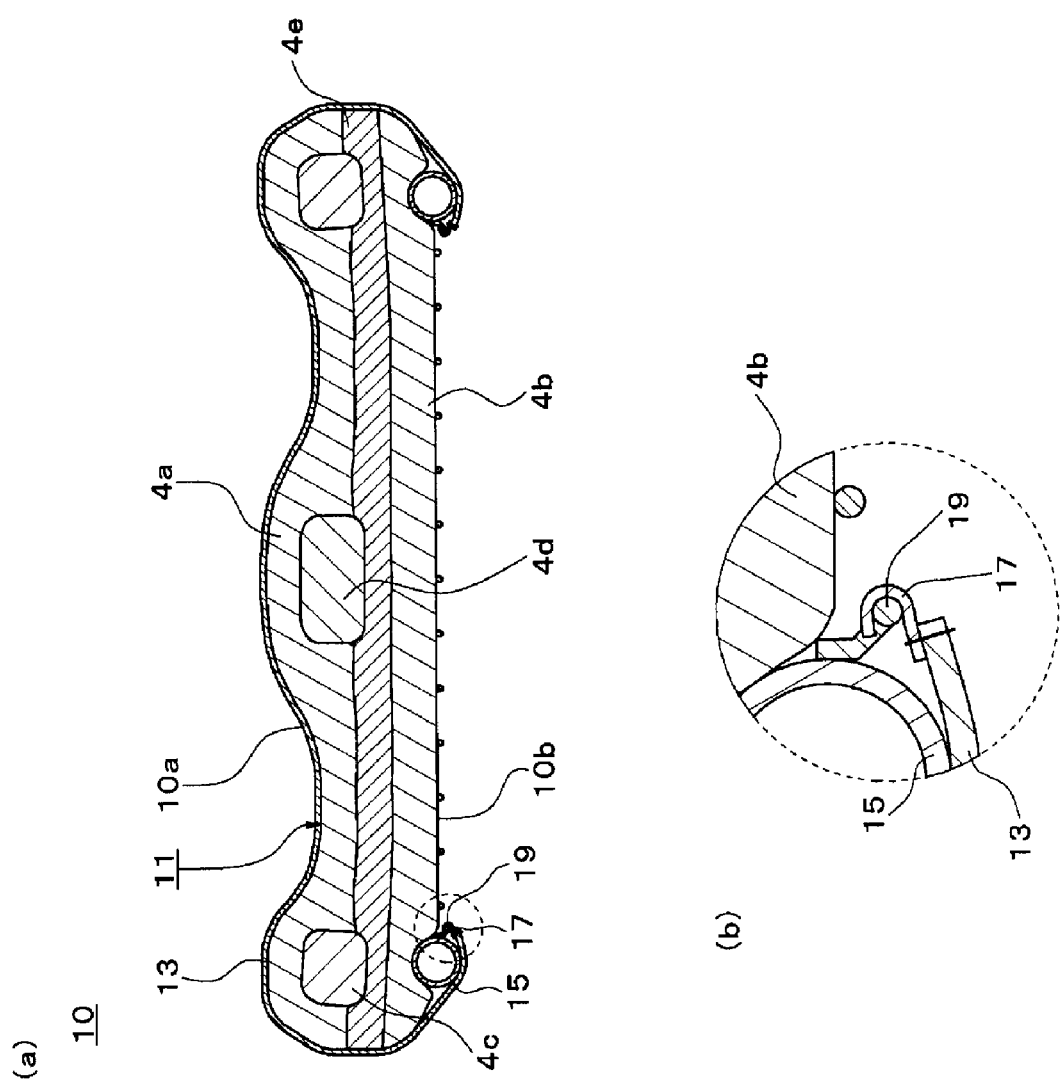
FIG. 11 is sectional views showing a state that a seat portion of the seat has been cut in a widthwise direction thereof.

Next, details of a seat using the cushion body 11 will be explained. FIG. 11 includes sectional views showing a state where a seat portion of a seat has been cut in a widthwise direction, FIG. 11 (a) being a view showing the whole of the seat portion, and FIG. 11 (b) being a view showing a region circled in FIG. 11 (a) in an enlarged manner. As shown in FIG. 11 (a), the seat portion 10 includes a cushion body 11, a cover 13, and a seat frame 15. A surface of the cushion body 11 is coated with the cover 13, and as shown in FIG. 11 (b), a trim cord 17 made from resin is sewn to an end portion of the cover 13. The trim cord 17 is formed to have an about J shape in section, and a member such as a string can be hooked on a bent portion formed at a distal end of the trim cord 17. On the other hand, an engagement portion 19 is provided inside the seat frame 15 in a projecting manner. A wire is provided on the side of a distal end of the engagement portion 19. The cover 13 can be fixed to the seat frame 15 by hooking the bent portion of the trim cord 17 on the wire of the engagement portion 19.

Next, a method for manufacturing a seat portion 10 of a seat for a vehicle will be explained in detail. First, a hot-melt film is caused to adhere to a surface of the cushion body 11 before the high pressure steam forming, and the surface is coated with the cover 13. Next, the cushion body 11 whose surface is coated with the cover 13 is introduced into a high pressure steam molding machine, wherein high pressure steam molding is performed so that the cushion body 11 and the cover 13 are formed integrally.

The molded cushion body 11 is taken out of the high pressure steam molding machine, and it is left for a while to dry. After drying, the trim cord 17 made from resin is sewn on the end portion of the cover 13. Next, wrinkles of a surface of the seat portion 10 are removed by pulling the end portion of the cover 13 and the trim cord 17 is hooked to the engagement portion 19. The above is directed to explanation about the seat portion 10 of the seat 1, but the seat back portion 20 can also be manufactured according to similar steps.

The invention claimed is:

1. A molded cushion body comprising:
    a first fibrous structure including a mix of main fibers and binder fibers, wherein the first fibrous structure comprises only fibers;
    a second fibrous structure including a mix of main fibers and binder fibers, wherein the second fibrous structure comprises only fibers, and wherein the first and second fibrous structures have different hardnesses; and,
    a load receiving member, wherein the load receiving member comprises a single member between and touching both of the first and second fibrous structures, wherein the load receiving member has a flexing degree to load in a load direction that is smaller than flexing degrees of the first and second fibrous structures to load in the load direction, wherein the first and second fibrous structures and the load receiving member form a molded stack, and wherein the load receiving member is formed from one of a fiber material and a resin material.

2. The cushion body according to claim 1, wherein the load receiving member comprises approximately the same fiber material as the first and second fibrous structures and has a fiber density higher than that of the first and second fibrous structures.

3. A molded cushion body comprising:
    a first fibrous structure including a mix of main fibers and binder fibers, wherein the first fibrous structure comprises only fibers;
    a second fibrous structure including a mix of main fibers and binder fibers, wherein the second fibrous structure comprises only fibers, and wherein the first and second fibrous structures have different hardnesses; and,
    a load receiving member, wherein the load receiving member comprises a single member between and touching both of the first and second fibrous structures, wherein the load receiving member has a flexing degree to load in a load direction that is smaller than flexing degrees of the first and second fibrous structures to load in the load direction, wherein the first and second fibrous structures and the load receiving member form a molded stack, and wherein the cushion body comprises an elevated pressure steam blown molded fibrous structure.

4. The cushion body according to claim 3, wherein the elevated pressure steam blown molded fibrous structure comprises main fibers and binder fibers, wherein the main fibers have a higher melting point than a melting point of the binder fibers, and wherein the elevated pressure steam blown molded fibrous structure comprises an elevated pressure, elevated temperature between the two melting points, steam blown molded fibrous structure.

5. The cushion body according to claim 1, wherein the cushion body comprises a load receiving face and a non-load receiving face, and wherein the cushion body further comprises an elevated pressure steam blown molded fibrous structure such that the non-load receiving face is more steam blown than the load receiving face.

6. A seat comprising a cushion body and a seat frame supporting the cushion body, wherein the cushion body comprises the cushion body according to any one of claims 1 to 5.

* * * * *